United States Patent
Benedetti (10) Patent No.: US 6,868,883 B2
(45) Date of Patent: Mar. 22, 2005

(54) APPARATUS AND METHOD FOR REDUCING WALLBOARD WASTE DURING MANUFACTURE

(75) Inventor: John Benedetti, Negley, OH (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

(21) Appl. No.: 10/187,773

(22) Filed: Jul. 1, 2002

(65) Prior Publication Data

US 2004/0000372 A1 Jan. 1, 2004

(51) Int. Cl.[7] .......................... B32B 13/00; B65H 19/00
(52) U.S. Cl. ....................... 156/353; 156/361; 156/502; 156/504
(58) Field of Search ............................. 156/39, 44, 45, 156/46, 157, 158, 159, 64, 346, 350, 351, 353, 361, 362, 363, 502, 504; 242/553, 554, 555, 554.1, 556, 554.2

(56) References Cited

U.S. PATENT DOCUMENTS

| | | | |
|---|---|---|---|
| 4,512,225 A | * 4/1985 | Green | 83/38 |
| 5,190,234 A | * 3/1993 | Ezekiel | 242/552 |
| 5,388,387 A | 2/1995 | McElvy | 53/451 |
| 5,437,749 A | 8/1995 | Pipkorn et al. | 156/64 |
| 5,443,681 A | 8/1995 | Stivani et al. | 156/504 |
| 5,718,797 A | 2/1998 | Phillips et al. | 156/346 |
| 5,879,446 A | 3/1999 | Patel et al. | 106/781 |

* cited by examiner

Primary Examiner—Sue A. Purvis
(74) Attorney, Agent, or Firm—Ice Miller (57) ABSTRACT

An apparatus and method for reducing the amount of wallboard wasted during the manufacturing process is disclosed. Wallboard sections that contain a cover paper splice, which sections must go to waste, are reduced in size during the manufacturing process. This is accomplished by determining the optimum location for a cover paper splice to be made and making the splice at or near this location, such that a rotary knife can readily isolate the splice onto a section of wallboard having a reduce length. This function is accomplished using any suitable computer equipment capable of monitoring desired manufacturing conditions and using this data to calculate the optimum location for a splice.

14 Claims, 3 Drawing Sheets

APPARATUS AND METHOD FOR REDUCING WALLBOARD WASTE DURING MANUFACTURE

TECHNICAL FIELD

The present invention relates generally to an apparatus and method for manufacturing wallboard, and more specifically to an apparatus and method for reducing the amount of wallboard wasted during the manufacturing process.

BACKGROUND

Gypsum board is well known and widely used in the construction industry as a convenient way to construct walls, barriers and other structural formations. The use of inorganic gypsum board, which is also commonly known as "wallboard" or "drywall," is often desirable over more expensive and time consuming conventional wet plaster methods. A typical sheet of wallboard comprises a gypsum core, a back cover sheet on one surface of the core and a face or front cover sheet on the other core surface. One cover sheet is typically folded around the long side edges of the core and overlaps the side edges of the other cover sheet. Apparatuses and methods for the commercial manufacture of wallboard are well known, and instances of such apparatuses and methods can be found, for example, in Kirk-Othmer, Encyclopedia of Chemical Technology, Second Edition, 1970, Vol. 21, pages 621–24, which is incorporated herein by reference. Other examples can also be found in U.S. Pat. Nos. 5,718,797 and 5,879,446, both of which are commonly assigned to the assignee of the present application, and both of which are incorporated herein by reference in their entirety.

Generally, wallboard is conventionally produced by sandwiching a core of aqueous "slurry" or paste of calcined gypsum and other materials between two extremely long and continuous sheets of board cover paper. Various types of cover paper are known in the art, and all such types can be used for this purpose. After the gypsum slurry has set (i.e., reacted with the water from the aqueous slurry) for a period of time, the resulting extremely long board is then cut into manageable sections. These sections are then fully dried and the finished product becomes a strong, rigid, fire-resistant building material, which can then be cut into various board sizes as desired.

Commercial manufacture of gypsum wallboard is often accomplished by processes that are capable of operation under continuous high speed conditions. In such applications, the aqueous slurry of calcined gypsum and other ingredients are continuously deposited onto a first continuously supplied and lengthy moving sheet of cover paper. Shortly thereafter, a second continuously supplied and lengthy moving sheet of cover paper is then directed over the top of the slurry, such that the slurry is then sandwiched between the two sheets of cover paper. This resulting product continues to move onward from this "wetend" location (where the paper and slurry are combined) at high speeds.

Because continuous high speed operation without interruption is desirable in the manufacturing process, "on the fly" splicing of a new roll of cover paper to the end or near the end of a depleted roll is common practice. It is thus typical to have a pair of adjacent spindles for mounting two huge rolls of cover paper for both the first and the second continuously supplied and moving sheets of cover paper. A machine or operator monitors a roll of cover paper in use and notes when that roll of cover paper is close to expiring. A leading edge of the adjacent new roll of cover paper is primed, and at an appropriate time a "splice bar" is usually employed to quickly and uniformly attach this leading edge to the depleted roll via appropriate attaching means.

Such a splice bar is well known in the art, and may be automated or manually controlled. In practice, the cover papers are continuously moving and the spindles are rotating at high enough speeds such that a splice is made some distance in front of the trailing edge of the depleted roll. Because overlapping or double layering of cover sheets is particularly undesirable, as discussed in more detail below, the remainder of the depleted roll is then cut off just behind the splice after the splice is made. Even the best splicing process, however, results in at least some short segment of overlap between the old and the new cover papers where they are attached to each other. The frequency of this problem is doubled due to the need for splicing in both the top and bottom cover papers.

Continuous movement away from the wetend location where the slurry and paper come together typically takes place on multiple conveyors, rollers, or other similar devices laid forth in series, such that the product being manufactured generally comprises a continuous piece of setting wallboard that extends for hundreds or even thousands of feet. Although lengths, speeds and times may vary in this type of wallboard manufacturing process, a long "board line" is needed in order for the slurry to set for a sufficient amount of time before cutting can be attempted. This setting time should be anywhere from 3 to 6 minutes, with board line lengths and processing speeds varying to ensure that a minimum setting time is met. Of course, the actual lengths and speeds may be adjusted as desired to control for not only an appropriate amount of time for the slurry to set, but also to increase the amount of wallboard that can be produced.

Initial cutting of the resulting continuously formed sheet of wallboard is typically accomplished through a machine such as a rotary knife. When activated, such a knife rotates as it cuts the rapidly passing wallboard, such that a clean cut is made and the wallboard is not buckled, sheared or otherwise significantly deformed at the cut edges. A processor or other type of control unit can be set up to control this knife to some degree with additional manual controls and input also being available. This rotary knife initially cuts the continuously moving wallboard into large but manageable sections. These sections are then processed on different conveyors or rollers through layered kilns in order for the sections of cut wallboard to fully dry and harden to a final state before they can be cut into smaller, commercial standard sized pieces. Drying in heated kilns, however, tends to warp, buckle, pop, cavitate, crumble or otherwise distort wallboard due to uneven drying at any imperfection or exposed edge. As a result, cut sections of wallboard are typically sent through the drying kilns side-by-side and end to end in order to minimize exposed edges and the corresponding amount of distortion due to uneven drying. Thus, wallboard sections are often put into pairs or otherwise grouped after cutting and before kiln drying. This process of pairing or grouping wallboard sections can also be automated, and often involves some sections of wallboard being flipped over from the end of the cutting conveyor belt or roller onto the start of a drying conveyor belt or roller.

Cover paper splices, as described above, are a particularly undesirable imperfection in wallboard, and prudent manufacturing practices dictate against sending any section of wallboard containing a splice through the drying kilns. In addition to resulting in an ultimately poor commercial product, wallboard sections containing a cover paper splice are particularly susceptible to distortion and/or disintegration while in a drying kiln. Such wallboard disintegration can sometimes result in an unwanted system shutdown in order to clean and restart a jammed or contaminated kiln. Accordingly, wallboard segments containing a cover paper splice are routinely isolated and rejected after they are initially cut by a rotary knife and before they are processed through a kiln. Although most of the materials in a rejected wallboard segment can be recycled, excessive scrapping and/or recycling of rejected materials results in reduced productivity and introduces undesirable strain and wear on the manufacturing system. As such, the necessary removal of wallboard sections containing cover sheet splices is considered to be waste regardless of whether some material from such sections is eventually recycled.

Furthermore, because wallboard sections tend to be kiln dried in groups of two or more, the removal of one wallboard section due to a problem or defect such as a cover paper splice usually means that at least one other satisfactory wallboard section must be removed and go to waste as well. This is particularly true where a substantial portion of the overall process is automated, such that removal of one defective section of wallboard leaves the preceding or following section without a mate for the grouping and drying process, absent manual intervention. Although this results in a significant amount of wasted product every time a cover paper splice reaches the knife, such waste is a matter of course in most commercial wallboard manufacturing operations.

Compounding the issue is the fact that the rotary knife is typically automated, and is usually set to make repeated cuts only at standard intervals or distance increments that result in repeated sections of cut wallboard of a particularly desired length. For example, if these lengths tend to be on the order of 24 to 30 feet, then a group comprising at least 48 to 60 linear feet of wallboard must be scrapped or otherwise wasted every time that a cover paper splice occurs. Full manual operation of the knife during the occasional passing of a cover paper splice is not only impractical, but also very difficult to practice with any reliable level of precision due to the high speeds at which the wallboard travels and the knife operates.

Accordingly, there exists a need for an apparatus and method that reduces the amount of wallboard that is scrapped or wasted during the manufacturing process, and in particular the amount of wallboard that is scrapped or wasted due to the cover paper splices that are inherent to the manufacturing process.

SUMMARY

It is an advantage of the present invention to provide an apparatus and method for reducing the amount of wallboard wasted during the process of manufacturing the wallboard. According to one embodiment of the present invention, an apparatus and method reduces the lengths of wallboard sections that contain a cover paper splice and thus must go to waste. This can be accomplished by determining the optimum location for a cover paper splice to be made, such that the control mechanism for the downstream rotary knife is able to readily isolate the splice onto a length of wallboard that corresponds to the smallest cut length that is possible. This function can be accomplished using any suitable commercially-available computer equipment capable of monitoring desired manufacturing conditions and using this data to calculate the optimum location for a splice.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures for the disclosed inventive customer interface web site. These drawings in no way limit any changes in form and detail that may be made to the invention by one skilled in the art without departing from the spirit and scope of the invention.

DETAILED DESCRIPTION

An example application of a system and method according to the invention is described in this section. This example is being provided solely to add context and aid in the understanding of the invention. Other applications are possible, such that this example should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is a reduction in the amount of wallboard that must be scrapped or otherwise wasted due to the existence of cover paper splices. This advantage is accomplished through an apparatus and method that is designed to specifically minimize the size of the cut wallboard pieces that contain these splices.

Another advantage of the present invention is the availability of both automated and operator controlled processes that aid in achieving its ends. Accordingly, those practicing the invention are provided the opportunity to implement the inventive processes described herein as fully automated or, alternatively, may elect to have varying levels of manual operator participation and/or intervention.

Modern technologies such as computers, processors, automated systems and the like offer new opportunities for manufacturers to produce products more rapidly and efficiently. The present invention provides an apparatus and method for reducing the amount of wallboard that is wasted during the process of manufacturing wallboard. This is preferably accomplished by determining the optimum location for a cover paper splice to be made and providing a way for an operator or automated process to make the splice at or substantially near the optimum location. A control mechanism for a downstream rotary knife is then provided with the ability to anticipate the arrival of the cover paper splice and readily isolate this splice onto a length of wallboard that is reduced in size. These functions can be accomplished using any suitable computer equipment and software capable of monitoring manufacturing conditions, using this data to calculate optimum locations for cover paper splices to be made, and communicating information to the operators or automated systems controlling both splice bars and rotary knives such that cover paper splices are made in proper locations and are appropriately isolated onto wallboard sections of reduced size.

Figure 1:
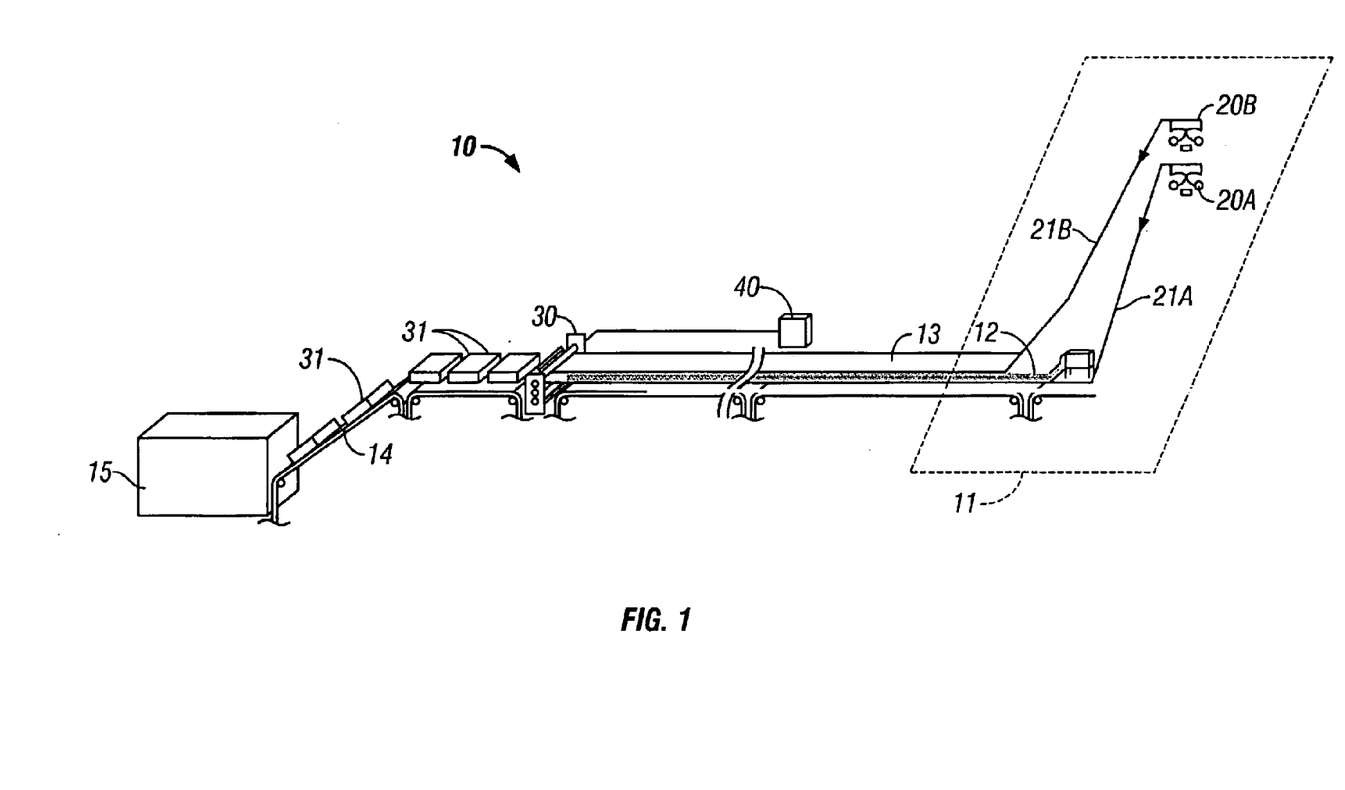
FIG. 1 illustrates an exemplary system for the commercial manufacture of wallboard.

Referencing FIG. 1, an exemplary system 10 for the commercial manufacture of wallboard is illustrated. At a wetend region 11 of this system 10, two configurations 20A and 20B for supplying two continuous streams of cover paper can be seen. Although dimensions may vary, this continuously supplied cover paper is typically four to five feet in width, and is supplied continuously from huge rolls having a diameter of four to six feet or more. A bottom cover paper 21A is supplied by a bottom cover paper supply configuration 20A comprising two large spindles, each capable of supporting one huge roll of cover paper. Configuration 20A also preferably comprises a mechanism for splicing the beginning of one roll of cover paper to or near the end of the other roll of cover paper, further details of which are discussed below. A top cover paper 21B is supplied by a separate top cover paper supply configuration 20B, which configuration is substantially similar to the configuration 20A for the bottom cover paper.

As the bottom cover paper 21A leaves its point of origin at configuration 20A, it travels along a conveyor, roller, belt or other like system to a point where its edges are upturned at substantially right angles with respect to the otherwise horizontally oriented bottom cover paper. Methods and devices for creating such upturned edges on cover paper on the fly are well known in the art, and any such methods and devices for performing this function may be utilized in practicing the present invention. A slurry 12 of wet calcined gypsum and other materials is then continuously deposited on the moving continuous sheet of bottom cover paper 21A at a given location, which is preferably after the edges on the bottom cover paper have been upturned to form a shallow trough for receiving and containing the slurry. The slurry 12 quickly settles and evens out within the moving bottom cover paper 21A due to the liquid state of the slurry and the ongoing forward motion of the bottom cover paper.

At some distance after the slurry 12 has been deposited onto the bottom cover paper 21A, the top cover paper 21B is directed into place atop the wet slurry and bottom cover paper, thereby forming a "sandwich" of slurry within sheets of cover paper. As for the bottom cover paper, the top cover paper leaves its point of origin at configuration 20B and travels along a similar but separate conveyor, roller, belt or other like system until it is directed into place atop the slurry and bottom cover paper. A "wet" wallboard is thus formed at this point, and several minutes are generally required until the wet wallboard has set sufficiently such that it can be cut and dried further. Because the manufacturing process would be considerably slowed by allowing this newly formed "wet" wallboard to sit in place while it sets for cutting, this newly formed wallboard is thus continually moved forward on a "board line" 13 so that new wet wallboard can continue to be made while setting occurs. This board line 13 can extend for hundreds or thousands of feet before cutting.

Although lengths, speeds and times may vary in this type of wallboard manufacturing process, the following example is provided here for illustrative purposes. A continuously formed sheet of wallboard may, for example, be processed at about 440 feet per minute down a series of conveyors that extend for about 1600 feet from the wetend to the location where the continuous sheet of wallboard is first cut. This board line and speed would then result in a setting time that is slightly more than 3½ minutes in this example. In addition, approximately 300 feet separates the wetend from the actual splicing location for the cover paper rolls upstream of the wetend, resulting in a total distance from splice to knife of 1900 feet. Of course, other lengths and speeds may also be used, and are adjustable as necessary to control for an appropriate amount of time for the slurry to set, while also maximizing the amount of wallboard that can be produced.

Again referencing FIG. 1, a cutting mechanism such as a rotary knife 30 is located at the end of the board line 13 and is used to cut the now set wallboard into smaller and more manageable sections 31. Although a rotary knife or blade type device is preferred, other cutting mechanisms as would be readily understood by those skilled in the art may also be used. This rotary knife 30 generally comprises a blade that extends across the width of passing wallboard, and this knife rotates in a direction compatible with the direction of the wallboard when activated to cut passing wallboard, further details of which are described in greater detail below. The rotary knife 30 is also preferably controlled by or at least receives information from a control system 40 that is capable of measuring various parameters, assisting in the optimal placement of cover paper splices, and adjusting the timing of the knife cuts as necessary to isolate selected defects such as cover paper splices. Further details of this control system are also described in greater detail below.

After this initial cutting of the wallboard by the rotary knife 30, the cut wallboard sections 31 are then placed onto a separate conveyor or roller system 14 by manual or automated means so that they can be processed through heating kilns 15 or any other appropriate device for fully hardening and drying wallboard. Once these wallboard sections are sufficiently dried and hardened by the drying kilns or other drying device, they can then be further cut, bundled, packaged and processed in accordance with the desires of the manufacturer and the needs of consumers, through standard methods that are readily known to those skilled in the art. Such drying, bundling and packaging steps may be undertaken in any of a variety of ways, as the present invention is primarily directed towards the elimination of waste in the manufacturing process that typically occurs before these steps.

Figure 2:
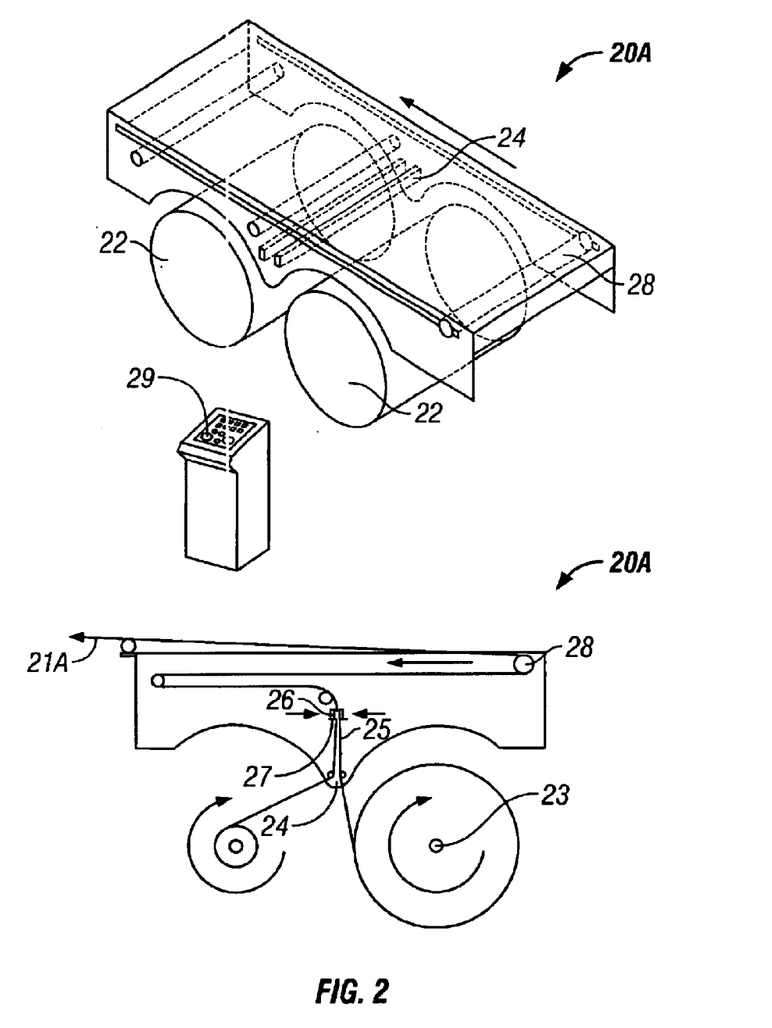
FIG. 2 illustrates an example of a cover paper configuration and splice bar according to one embodiment of the present invention.

Turning now to FIG. 2, an example of a cover paper configuration and splice bar according to one embodiment of the present invention is illustrated. Because the configurations for top and bottom cover papers are substantially similar, references here will be made only with respect to the configuration 20A for the bottom cover paper 21A, with it being understood that these or similar details apply for the top cover paper configuration 20B as well. As previously discussed, cover paper is preferably supplied continuously from one or more huge rolls 22 having a diameter of four to six feet or more. Even in this large size, however, rolls of cover paper tend to become used up approximately every hour during continuous operating conditions. Of course, this length of time will vary depending upon the size of the rolls and the speed of the manufacturing process.

To facilitate continuous system operation even during changes in cover paper rolls 22, it is preferable to have a pair of adjacent spindles 23 for mounting two huge rolls of cover paper for one particular cover paper source. Both rolls 22 are preferably placed onto their respective spindles such that cover paper coming off of the rotating roll in use is conveniently directed upward through an opening 24 above and between both rolls. A machine and/or operator monitors a roll of cover paper in use and notes either manually or through an automated alarm or alert system when the roll of cover paper in use is close to expiring. For example, a low roll alarm (not shown) may be sounded when the diameter of the roll in use reaches approximately eight inches. Upon sounding of this alarm, a splice system logic program may be activated to begin observing knife cuts and make calculations as to where optimum cover paper splices can be made. Optionally, an operator may elect to override this system manually and make a splice without determining an optimum location.

A leading edge 25 of the adjacent new roll of cover paper is primed for splicing, and at an appropriate time a splice bar 26 is preferably employed to quickly and uniformly attach this leading edge 25 of the new roll to the expiring roll at or near its end via single-sided tape, double-sided tape, glue, paste, staples, pins, or other appropriate attaching means as will be readily understood by those skilled in the art. In a particularly preferred embodiment, strong double-sided tape is used as the attaching means, and this double-sided tape is placed across the leading edge 25 of the new roll of cover paper such that the exposed tape surface can be pressed against the depleted roll of cover paper during the splicing process. Leading edge 25 of the new roll of cover paper preferably awaits splicing at a location above opening 24 and against splice bar 26, which ideally comprises a bar or blunt surface capable of providing a firm and even force across the leading edge 25 during the splicing process. At an appropriate time, a manual or automated command is given, and splice bar 26 is pressed toward the active and rapidly expiring old roll of cover paper such that contact is made between the old roll of cover paper and the exposed tape. Preferably, a complementary bar or blunt surface is located on the other side of the old roll of cover paper opposite splice bar 26, such that a better splice or attachment is achieved.

While it is relatively easy to utilize the leading edge of the new roll of cover paper, continuous high speed operations render utilization of the trailing edge of the depleted roll of cover paper as impractical. Accordingly, splicing preferably occurs at some location on the depleted roll close to but not at the end of the roll, such that a small amount of cover paper at the end of the roll goes unused. Of course, methods could possibly be employed to utilize this cover paper by actually splicing the trailing edge of a depleted cover paper roll, but such methods would likely be impractical in light of the desired high speed continuous operation of the manufacturing process. Because overlapping or double layering of cover papers is particularly undesirable, the remainder of the depleted roll is cut off just behind the splice after the splice is made by cutting shear 27, which acts automatically in conjunction with the splice bar 26.

While continuous, high speed and even supply of cover paper is highly desirable, it is conversely desirable for the splicing process between two rolls of cover paper to take place while the areas of paper being spliced are stationary. Accordingly, one or more dancer rolls 28 may be employed immediately downstream of the splice bar 26. Such dancer rolls 28 are preferably utilized to accumulate some small but significant "slack" length of cover paper such that this accumulated paper can be continuously fed into the system while the cover papers being spliced are held stationary for the short second or so that is needed for a splice to be made and for the new roll of cover paper to accelerate up to an appropriate speed. Thus, when a splice is about to be made, a dancer roll 28 can be made to provide its accumulated slack of cover paper into the system such that an even and continuous paper flow is not interrupted. The amount of slack that should be taken up onto a dancer roll is of course determined by the time needed for a splice and the time needed for a new roll of cover paper to accelerate to an appropriate speed. After a splice is made and the slack from a dancer roll has been substantially depleted, a new amount of slack may then be incorporated into the dancer roll over time in preparation for the next cover paper splice.

As discussed previously, the actual location of a cover paper splice is of significant importance according to a preferred embodiment of the present invention. While prior art splicing methods do not account for any particular location for a cover paper splice, a preferred embodiment of the present invention provides that an optimum location for such a splice be calculated and that this calculation be used in making the cover paper splice. The method for calculating such an optimum location can be accomplished either manually or by one or more computer processors, with details of this method provided below. The way that this calculation can be used to implement a splice at an optimum location may vary.

In one embodiment, a computer processor or other device can be used to indicate to an operator optimum instances that the splice bar can be manually activated such that a splice is made at an optimum location. Such indications can be made by use of an indicator light 29, whereby such light flashes at each instant where activation of the splice bar would result in a splice at an optimum location. Because optimum locations for a splice will recur repeatedly at regular intervals, as explained in greater detail below, use of an indicator light 29 would then result in repeated blinks or flashes of the light at regular intervals. A manual operator could then observe the repetitive pattern of light flashes and the manually activate the splice bar at a time at or within a split-second of an anticipated light flash according to the repetitive pattern. Because creation of a splice generally need not be in a precise location for purposes of the present invention, it may be acceptable to have some small amount of error in the timing of the splice bar activation and resulting splice location.

Alternatively, a computer processor or other device may likewise be used to determine optimum instances when the splice bar can be activated, but only so that that computer processor or some other automated process can activate the splice bar in an automated fashion. Such an automated approach would tend to result in a more precise placement of the splice, but with a resultant loss in manual operator activity and intervention that may be desired for other reasons. Once a splice is made at or near an optimum location, this event is communicated to one or more computer processors such that a mechanism controlling the rotary knife knows when to break away from its repetitive cutting pattern and make a special cut that isolates the splice onto a shortened section of wallboard, which technique will now be described in greater detail.

Figure 3:
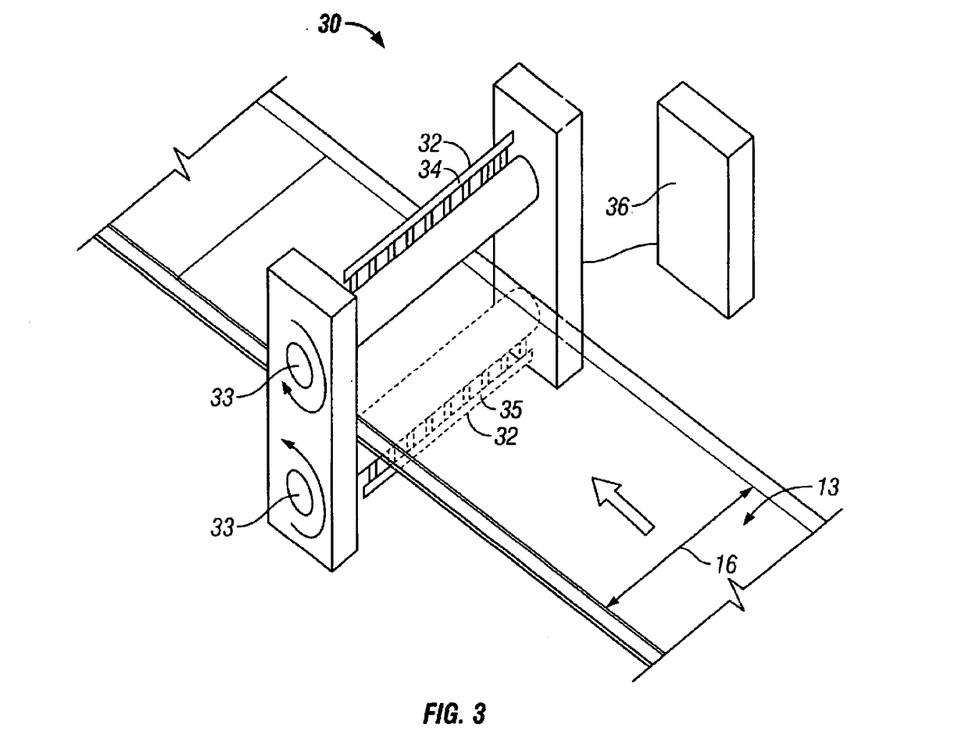
FIG. 3 illustrates an example of a rotary knife according to one embodiment of the present invention.

A detailed example of a rotary knife according to one embodiment of the present invention is illustrated in FIG. 3. Initial cutting of a newly formed and set sheet of wallboard at the end of the board line 13 is typically accomplished through a machine comprising one or more rotary knives or shears, such as rotary knife 30. The one or more blades 32 of this rotary knife 30 extend across the width of the wallboard 16, rotate about an axis 33, and are located directly above or below the passing wallboard, or both. When activated, a knife rotates at a velocity such that the knife is moving with and at roughly the same speed as the wallboard as it cuts the rapidly passing wallboard, such that a clean cut is made and the wallboard is not significantly deformed at the cut edges. In a preferred embodiment, two blades are used, with a primary blade 34 above the passing wallboard doing most of the cutting, while a secondary blade 35 beneath the passing wallboard provides adequate cutting or perforating sufficient to make at least a clean break in the bottom cover paper.

This rotary knife preferably contains a control mechanism 36 that is generally adapted to measure the speed at which the wallboard is traveling on the conveyor or roller, to control the speed at which the blade or blades rotate, and to control the time interval that passes between activations or rotations of the blade or blades. This control mechanism 36 can be manually operated to control the knife, but is usually set up with an automated computer control having manual override settings and/or options. In practice, the control mechanism is set such that the knife rotates at a speed that is compatible with the passing wallboard. Continuous motion of the knife, however, would result in shortened board sections having a length that is particularly undesirable. For example, while wallboard is typically cut in sections that range from 24 to 30 feet in length, continuous motion of the knife would tend to result in wallboard sections that are about 4 feet in length. Of course, actual lengths may vary from system to system depending on varying physical characteristics of each system and knife. In addition to these sections of board likely being too short for desired use, continuous motion of the knife undesirably accelerates the wear and breakdown of the knife. Accordingly, the control mechanism 36 operates to control the amount of board that passes through the knife between knife cuts, which may be done via a time interval through which the knife waits between activations, whereby the length of this time interval will then correspond to the length of the cut sections.

For example, in the illustrative example described earlier herein, a delay of 3 seconds would result in a cut section that increases from 4 feet in length (no delay) to 26 feet in length (4+3*7.33 ft./sec.). Manipulation of this time interval will then result in a correspondingly longer or shorter length of cut wallboard sections. Because uniformity is highly desired in the highly automated commercial wallboard manufacturing process, however, the interval setting on the control mechanism 36 usually tends to be constant, such that uniform lengths of wallboard are repeatedly produced. Of course, the uniform length of produced wallboard sections may be adjusted through adjustment of this time interval, but such adjustment is typically made manually and infrequently.

Alternatively, control mechanism 36 may simply measure the amount and rate of board passing through the knife and use these parameters, rather than a set time interval, to determine when the knife should be activated to make the next cut. This technique is particularly desirable where the line speed of the board varies, such that use of only a set time interval would not be effective in controlling the lengths of cut board sections. Techniques for implementing a sensor to measure the amount and rate of passing board and the knife and for using this information to control activations of the knife are well known and available on most commercial rotary knife systems.

One exception to the uniformity in cut wallboard lengths can occur in instances where test samples of wallboard are desired for quality control purposes. In such instances, a small section of wallboard is cut and taken away from the system for standard quality assurance testing regarding the wallboard materials. Such test pieces are generally made at regular time intervals, such as once per hour, for example. Because 24 to 30 linear feet of wallboard is certainly not necessary for such a test, provisions are generally provided for an operator or for control mechanism 36 to automatically cut as small a piece of wallboard as possible to provide this quality sample. Because this quality sample is immediately removed from the manufacturing process either manually or through an automated device, disturbances in the irregularity of this shortened cut are generally eliminated. The location of such a cut is not important, and in fact a random location is desired for purposes of quality control integrity. As discussed above, the smallest cut possible is the one where the blade or blades of the rotary knife rotate continuously to make two cuts rather than one. In the illustrative example provided herein, such a continuous rotation results in a cut wallboard section that is four feet in length, although other minimum lengths are certainly contemplated, which lengths would be largely dependent upon the physical characteristics of the blade and the speed of passing wallboard.

Hence, the ability of the knife to deviate from its regular pattern of cutting set lengths of wallboard sections can be had at least for purposes of a test sample, where the time interval between knife activations is essentially reduced to zero. Such an ability to deviate from its regular pattern may be provided to the knife control mechanism in an automated fashion, such as by requiring a test piece to be cut every hour, or in manual fashion, by permitting an operator to eliminate or alter a specific time interval through appropriate manual controls. According to one embodiment of the present invention, such an ability to deviate from a regular cutting pattern may also be provided either manually or in automated fashion at the time that a cover paper splice is being processed at the knife through the methods and apparatuses disclosed herein. In fact, such a shortened section of wallboard containing a cover paper splice may also be used as a quality sample, since appropriate quality checks on the materials contained therein can be made whether a splice exists in the quality test sample or not. Accordingly, manipulation of the knife to isolate some or all cover paper splices onto shortened wallboard sections that can then be used to satisfy a quality control requirement can eliminate or substantially reduce the amount of wallboard that is wasted due to cover paper splices.

Figure 4:
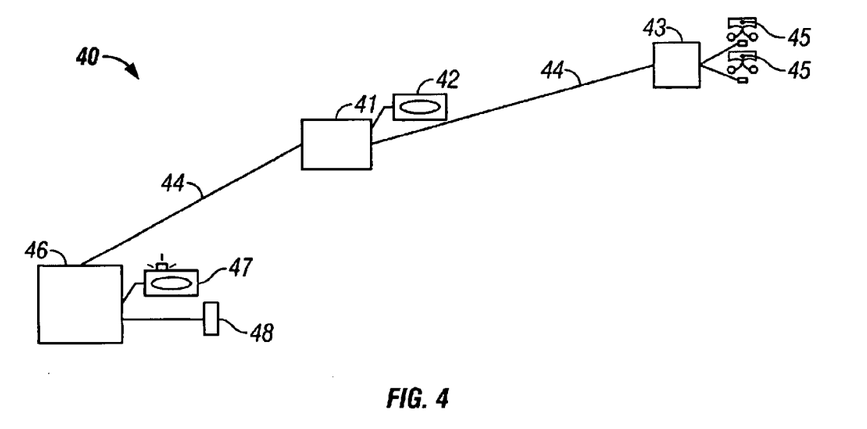
FIG. 4 illustrates an exemplary control system for monitoring manufacturing conditions and facilitating control of the splice bar and the rotary knife according to one embodiment of the present invention.

Turning now to FIG. 4, an exemplary control system 40 for monitoring manufacturing conditions and facilitating control of the splice bar and the rotary knife according to one embodiment of the present invention can be seen. This control system 40 is preferably capable of measuring various parameters, such as the speed of the wallboard passing through the knife, the amount of cover paper in a dancer roll, and the amount of cover paper left in a cover paper roll, among others. Control system 40 preferably comprises at least one primary computer processor 41 that is capable of processing data corresponding to the foregoing measured parameters, calculating results from this data, and communicating these results in an appropriate manner to various locations, including at least both cover paper splice areas and the rotary knife. By way of example, primary computer processor 41 may comprise a Programmable Logic Controller ("PLC") such as the SLC 5/04 processor manufactured by the Allen-Bradley Company of Milwaukee Wis. This primary processor 41 preferably also communicates pertinent information to a primary display 42 in a manner that is readily understood by an operator. This primary display 42 may be, for example, a Panelview 500, which is also manufactured by the Allen-Bradley Company of Milwaukee Wis. Information such as the knife setpoint, the line speed, and the time taken to complete one cut are displayed, such that an operator is able to verify these values. Standard provisions readily understood by those skilled in the art for inputting data or directions manually into primary processor 41 are also provided.

It is preferable that control system 40, and primary processor 41 in particular, be programmed to calculate one or more optimum cover paper splice locations per the following system. First, a calculation is made as to the amount of cover paper that is on the line between the splice bar and the knife were a knife cut and a splice to occur at the exact same time, as there will always be a set or constant amount on the line. For any given knife setpoint, where said setpoint is the constant rate at which the knife is making cuts (which corresponds to cut board lengths), a "group amount" can be calculated. As discussed previously, cut sections of wallboards are typically placed into groups of 2 to 4 or more wallboards. For purposes of this discussion, the group size will be 2 in the illustrative example used herein. Thus, given the amount of cover paper on the line between the splice bar and the knife, the knife setpoint, and the group size, a "group amount" or the number of complete groups that are on the line can be determined by the following formula:

$$G = \frac{L}{s*g}$$

where G is the group amount, L is the length of cover paper or "board" from the knife to the splice bar, s is the length of cut sections of wallboard, and g is the number of cut sections in a group. Referring again to the ongoing illustrative example, there is 1900 feet between the splice bar and the knife. Assuming for purposes of this illustration that the knife setpoint is set such that wallboard sections of 30 feet in length are being cut, and that there are 2 wallboard sections per group, then there are 31.67 groups on the line between the knife and the splice bar (1900/(30*2)), such that the group amount here is 31.67.

As in the present illustration, there is usually a remainder that does not make a complete group, and this remainder is of particular interest. Here, the first 31 complete groups are of minimal interest for purposes of the present calculation, while the 0.67 is the remainder or extra partial group of interest. The portion of group that is missing from making this remainder or extra partial group a complete group is represented by the formula:

$$P=(1-r)$$

where P is the portion of group required to make a full group and r is the existing remainder or extra partial group. In the present illustrative example, P is thus 0.33 (1–0.67), which is the amount of group that is required to combine with the present remainder to make a complete group. Thus, if 0.33 group of board was allowed to pass through the knife after a group cut is made, and a splice was made at exactly that point in time, then that splice would arrive at the knife exactly on a group cut. More specifically, 0.33 group of board in this example, where a group of board is 60 feet in length (30*2), translates to 20 linear feet of board (0.33*60). Thus if a splice is made at the exact time when 20 feet of board has passed through the knife after a group cut, then that splice will arrive at the knife on a group cut.

This result is undesirable, however, as it then forces two different groups to have a partial splice on the edge of each. It is thus preferable for the splice to arrive at a location on the board line that is just before the knife as a cut that completes a group passing through the knife is made. When this occurs, a finished board group is completed and the knife can then cut a size of board at a shorter length, preferably the minimum possible length used for purposes of creating quality test samples, which will fully contain and isolate the splice. Accordingly, an offset adjustment is preferably added in the calculations for when a splice is optimally made, with this offset adjustment compensating for at least the length of the splice.

In a particularly preferred embodiment, this offset is determined to be a distance that corresponds to half the length of the cut section to be disposed or used for quality testing. In the ongoing example being used for illustrative purposes, the minimum length of a cut board section is four feet, such that the offset in this example is two feet. Accordingly, if a splice is made exactly when 22 feet of board (20+2) has passed through the knife after a group cut, then that splice will be two feet in front of the knife when a group cut is made for the 32nd time after that splice is made. At this point, the time interval between activations of the knife can be reduced, possibly to zero, such that the knife then isolates the splice on a section of board with a shortened or minimum length. Should the time interval be reduced to zero, then the knife would rotate continuously for two cuts, and the splice would be substantially centered on a section of cut wallboard of minimum length. Combining the above formulae and description, the ultimate desired lead length that passes through the knife after the end of a group cut that corresponds to when a splice is optimally made is represented by the following formula:

$$X=[\{1-\text{rem}(L/(s*g))\}*s*g]+f$$

where X represents the desired lead length, L is the length of cover paper or from the knife to the splice bar, s is the length of cut sections of wallboard, g is the number of cut sections in a group, rem(a) is the remainder of quantity a after removing the positive integer value, and f is the offset, which is preferably half the length of the minimum cut board length. For the ongoing illustrative example, $X=[\{1-\text{rem}(1900/(30*2))\}*30*2]+2$, which reduces to $[\{1-0.67\}*60]+2$, and ultimately 22 feet, as discussed previously.

Referring again to FIG. 4, primary processor 41 is programmed to make calculations according to the foregoing formulae, such that optimum locations for making splices can be determined when one or more variables in the foregoing formulae are altered. Because an optimum location for making a splice will recur in a similar location once for every passing board group, more than one optimum location can be calculated, and the corresponding data transmitted to the appropriate cover paper splice system. Preferably this data is reported in such a way that the cover paper splice system is able to indicate repeatedly the proper timing for activating the splice bar in order to create a splice in an optimum location, as described in more detail above. One or more processors 43 are located at the cover paper splice system, and these one or more processors are adapted to utilize a splice system logic program and/or communicate with primary processor 41, preferably via direct hard-wired connections 44, such that the passing of information between processors is not overly dependent upon communication rates.

Because one or more dancer rolls may collect a slack amount of cover paper, one or more lasers 45 or other appropriate tracking devices are preferably installed to monitor the amount of cover paper slack taken up in dancer rolls. Such lasers may be any suitable commercially available tracking laser such as, for example, the NR-100 model laser manufactured by Nova of San Diego, Calif. This tracked information regarding the amount of cover paper slack in the dancer rolls is then communicated by the one or more lasers 45 to the primary processor 41 and/or other system processors, such that the amount of slack can be accounted for while optimum splice locations are calculated.

Referring again to FIG. 4, one or more rotary knife processors 46 may be used to control the rotary knife. Similar to the processors for the cover paper splice system, these one or more rotary knife processors 46 are adapted to utilize a rotary knife logic program and/or communicate with primary processor 41, preferably via similar direct hard-wired connections 44, such that the passing of information between processors is not overly dependent upon communication rates. A knife display panel 47 preferably has a red light, signal, or other appropriate notification means on it that is activated when the system logic is enabled. This light or signal is activated when a splice has been made and is actually traveling down the board line, which light or signal then informs the knife operator that a splice is about to occur or that a splice in on the way, and thus provides notice to the operator of the oncoming splice, such that, for example, a manual quality sample will not be made until the splice has arrived at the knife. An encoder 48 is preferably mounted at or near the knife, and this encoder is used to measure how much board is passing through the knife at any given time. By using this encoder to measure board directly, changes in line speed can be accounted for such that they do not affect the resulting lengths of cut board sections. As in the case of the paper splice processors and lasers, communication from this encoder is preferably passed along to the control system 40, and especially to the one or more rotary knife processors 46 and to primary processor 41, such that the system can account for as much information as possible. An additional offset adjustment (not shown) can also be implemented manually at the knife after operator review. Such an additional offset would work to adjust or fine tune the splice location on a cut section of board forward or backward in inches, should the actual splice location be determined to be slightly off.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. An apparatus, comprising:
   a computer processor programmed to determine one or more optimum locations on a wallboard for a cover paper splice to be made during a continuous wallboard manufacturing process;
   a splice bar that can be controlled to make said cover paper splice at or substantially near one of said one or more optimum locations;
   a rotary knife that can be controlled to cut passing wallboard into sections; and
   a computer control unit connected to said rotary knife, said computer control unit programmed to communicate with the computer processor to obtain the location of said cover paper splice and programmed to cause said rotary knife to isolate said cover paper splice onto a specific section of wallboard that is of a predetermined length.

2. The apparatus of claim 1, wherein said computer control unit is programmed to reduce a time interval between knife cuts when said specific section of wallboard containing said cover paper splice is being cut.

3. An apparatus comprising:
   a computer processor programmed to determine one or more optimum locations on a wallboard for a cover paper splice to be made during a continuous wallboard manufacturing process;
   a splice bar that can be controlled to make the cover paper splice between a first cover paper and a second cover paper at or substantially near one of the one or more optimum locations;
   a cutting mechanism that cuts wallboard into sections; and
   a control mechanism connected to and that controls said cutting mechanism, said control mechanism programmed to communicate with the computer processor to obtain the location of said cover paper splice and programmed to cause said cutting mechanism to isolate said cover paper splice onto a specific section of wallboard that is of shorter length than other sections of wallboard.

4. The apparatus of claim 3, wherein the cutting mechanism comprises a rotary knife.

5. The apparatus of claim 3, wherein the cutting mechanism comprises two rotary knives.

6. The apparatus of claim 3, wherein the cutting mechanism comprises a first rotary knife positioned above the wallboard and a second rotary knife positioned below the wallboard.

7. The apparatus of claim 3, wherein the cutting mechanism comprises a blade or shears.

8. The apparatus of claim 3, wherein the apparatus is operably connected to a conveyor belt.

9. The apparatus of claim 3, further comprising a cutting shear that cuts the first cover paper behind the cover paper splice.

10. The apparatus of claim 3, further comprising at least one dancer roll downstream of the splice bar.

11. The apparatus of claim 3, further comprising a sensor that measures the rate at which the wallboard passes through the apparatus.

12. The apparatus of claim 1, wherein said computer control unit is programmed to cause said rotary knife to minimize the size of said specific section of wallboard on which said cover paper splice is isolated.

13. An apparatus comprising:
   a computer process programmed to determine one or more optimum locations for a cover paper splice to be made during a continuous wallboard manufacturing process and programmed to calculate a desired lead length according to the following formula:

$$X=[\{1-rem(L/s*g))\}*s*g]+f$$

wherein:
   X is the desired lead length that passes the cutting mechanism before the optimum location for a cover paper slice;
   L is the length of cover paper between the cutting mechanism and the splice bar;

s is the lengthy of cut sections of wallboard;

g is the number of cut sections in a group;

rem(a) is the remainder of quantity a after removing the positive integer value; and f is the offset;

a splice bar that can be controlled to make the cover paper splice between a first cover paper and a second cover paper at or substantially near one or more optimum locations;

a cutting mechanism that cuts wallboard into sections such that the cover paper splice is isolated onto a specific section of wallboard that is of shorter length than other sections of wallboard; and a control mechanism that controls the cutting mechanism; and a control mechanism that controls the cutting mechanism.

14. The apparatus of claim 13, wherein f is half of the length of the minimum cut board length.

* * * * *